(12) United States Patent
Lim et al.

(10) Patent No.: US 12,567,585 B2
(45) Date of Patent: Mar. 3, 2026

(54) COATED METAL OXIDE MATERIALS AND METHOD, PROCESS, AND APPARATUS FOR MAKING THE SAME

(71) Applicant: Hunt Energy Enterprises, L.L.C., Dallas, TX (US)

(72) Inventors: Jin-Myoung Lim, Coppell, TX (US); Francisco A. Lopez, Dallas, TX (US)

(73) Assignee: Action Battery Technologies, Inc., Dallas, TX (US)

( * ) Notice: Subject to any disclaimer, the term of this patent is extended or adjusted under 35 U.S.C. 154(b) by 0 days.

(21) Appl. No.: 18/300,263

(22) Filed: Apr. 13, 2023

(65) Prior Publication Data

US 2023/0335727 A1 Oct. 19, 2023

Related U.S. Application Data

(60) Provisional application No. 63/330,501, filed on Apr. 13, 2022.

(51) Int. Cl.
*H01M 4/48* (2010.01)
*B05D 5/12* (2006.01)
*H01M 4/62* (2006.01)

(52) U.S. Cl.
CPC ................ *H01M 4/48* (2013.01); *B05D 5/12* (2013.01); *H01M 4/628* (2013.01)

(58) Field of Classification Search
CPC ............ H01M 4/48; H01M 4/628; B05D 5/12
(Continued)

(56) References Cited

U.S. PATENT DOCUMENTS 5,910,298 A * 6/1999 Yamasaki ............... B01F 23/12
423/625
7,807,605 B2 * 10/2010 Gesenhues ............... B01J 23/74
502/355
(Continued)

FOREIGN PATENT DOCUMENTS

CN 103949654 B * 12/2015 .............. B22F 1/054
CN 103094549 B * 5/2016 ........... H01M 4/485
(Continued)

OTHER PUBLICATIONS

Notification of transmittal of the international search report and the written opinion of the international searching authority, or the declaration mailed Jul. 31, 2023, PCT International patent application No. PCT/US2023/018544 filed Apr. 13, 2023, 9 pages.
(Continued)

*Primary Examiner* — Brian K Talbot
(74) *Attorney, Agent, or Firm* — Baker Botts L.L.P.

(57) ABSTRACT

Coated metal oxide materials, methods, process, and apparatus for making the same are disclosed herein. In some embodiments, a method for making a coated metal oxide in a closed-loop continuous hydrothermal process includes mixing a first metal-containing solution and a first high energy component to facilitate formation of a metal oxide. The method can further include mixing an additional solution forming a coating on the metal oxide. In some embodiments, a process of making a coating metal oxide in a closed-loop system includes mixing a first metal-containing solution and a first high energy component to facilitate formation of a metal oxide, and forming a coating on the metal oxide, where the process occurs in one or more reactors.

11 Claims, 3 Drawing Sheets

(58) Field of Classification Search
USPC ........................................................ 427/58
See application file for complete search history.

(56) References Cited

U.S. PATENT DOCUMENTS

| 8,435,482 | B2 * | 5/2013 | Hutchings | .............. | B01J 23/002 |
| | | | | | 423/599 |
| 9,698,419 | B1 * | 7/2017 | Frianeza-Kullberg | ...................... | |
| | | | | | H01M 4/5825 |
| 9,711,789 | B2 * | 7/2017 | Zhu | ...................... | C01G 23/005 |
| 10,195,671 | B2 * | 2/2019 | Wang | .................. | F27D 99/0001 |
| 10,734,144 | B2 * | 8/2020 | Shirata | ...................... | H01F 1/11 |
| 11,367,874 | B2 * | 6/2022 | Wu | ...................... | H01M 4/525 |
| 2002/0064499 | A1 * | 5/2002 | Uchida | ................ | C01G 23/006 |
| | | | | | 423/598 |
| 2007/0020955 | A1 * | 1/2007 | Song | ...................... | H05K 1/162 |
| | | | | | 438/778 |
| 2010/0120179 | A1 * | 5/2010 | Zhamu | .................. | H01M 4/625 |
| | | | | | 257/E21.001 |
| 2010/0227221 | A1 * | 9/2010 | Chang | .................. | H01M 4/525 |
| | | | | | 429/231.95 |
| 2014/0131617 | A1 * | 5/2014 | Park | ...................... | H01G 11/50 |
| | | | | | 252/182.1 |
| 2016/0074849 | A1 * | 3/2016 | Jiang | ...................... | B01J 29/061 |
| | | | | | 502/182 |
| 2017/0298252 | A1 * | 10/2017 | Arnepalli | ............. | C09K 3/1436 |
| 2017/0349757 | A1 * | 12/2017 | Theodet | .................. | B01J 3/006 |
| 2020/0407846 | A1 | 12/2020 | Johansson et al. | | |
| 2022/0016608 | A1 * | 1/2022 | Sekine | .................. | B01J 35/643 |
| 2022/0131135 | A1 * | 4/2022 | Kang | .................. | H01M 4/1395 |

FOREIGN PATENT DOCUMENTS

| JP | 2002-102672 A | | 4/2002 |
| KR | 10-2013-0134396 A | | 12/2013 |
| KR | 10-2015-0081069 A | | 7/2015 |
| KR | 20150081069 A | * | 7/2015 |
| KR | 101640629 B1 | * | 7/2016 |
| WO | 2015099233 A1 | | 7/2015 |

OTHER PUBLICATIONS

Notification concerning transmittal of international preliminary report on patentability mailed Oct. 24, 2024, PCT International patent application No. PCT/US2023/018544 filed Apr. 13, 2023, 6 pages.

* cited by examiner

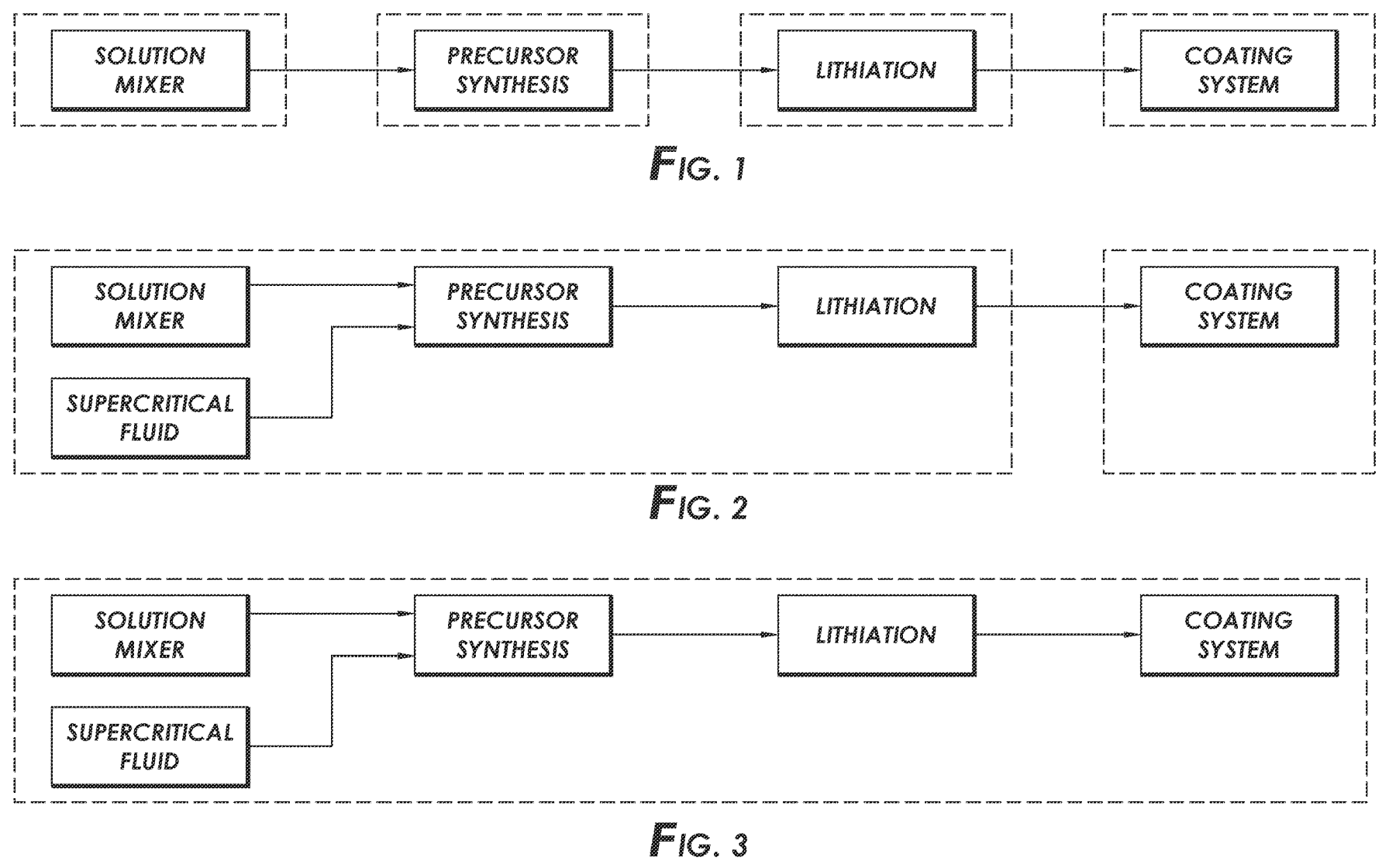

SOLUTION MIXER → PRECURSOR SYNTHESIS → LITHIATION → COATING SYSTEM

*FIG. 1*

SOLUTION MIXER → PRECURSOR SYNTHESIS → LITHIATION → COATING SYSTEM
SUPERCRITICAL FLUID → PRECURSOR SYNTHESIS

*FIG. 2*

SOLUTION MIXER → PRECURSOR SYNTHESIS → LITHIATION → COATING SYSTEM
SUPERCRITICAL FLUID → PRECURSOR SYNTHESIS

*FIG. 3*

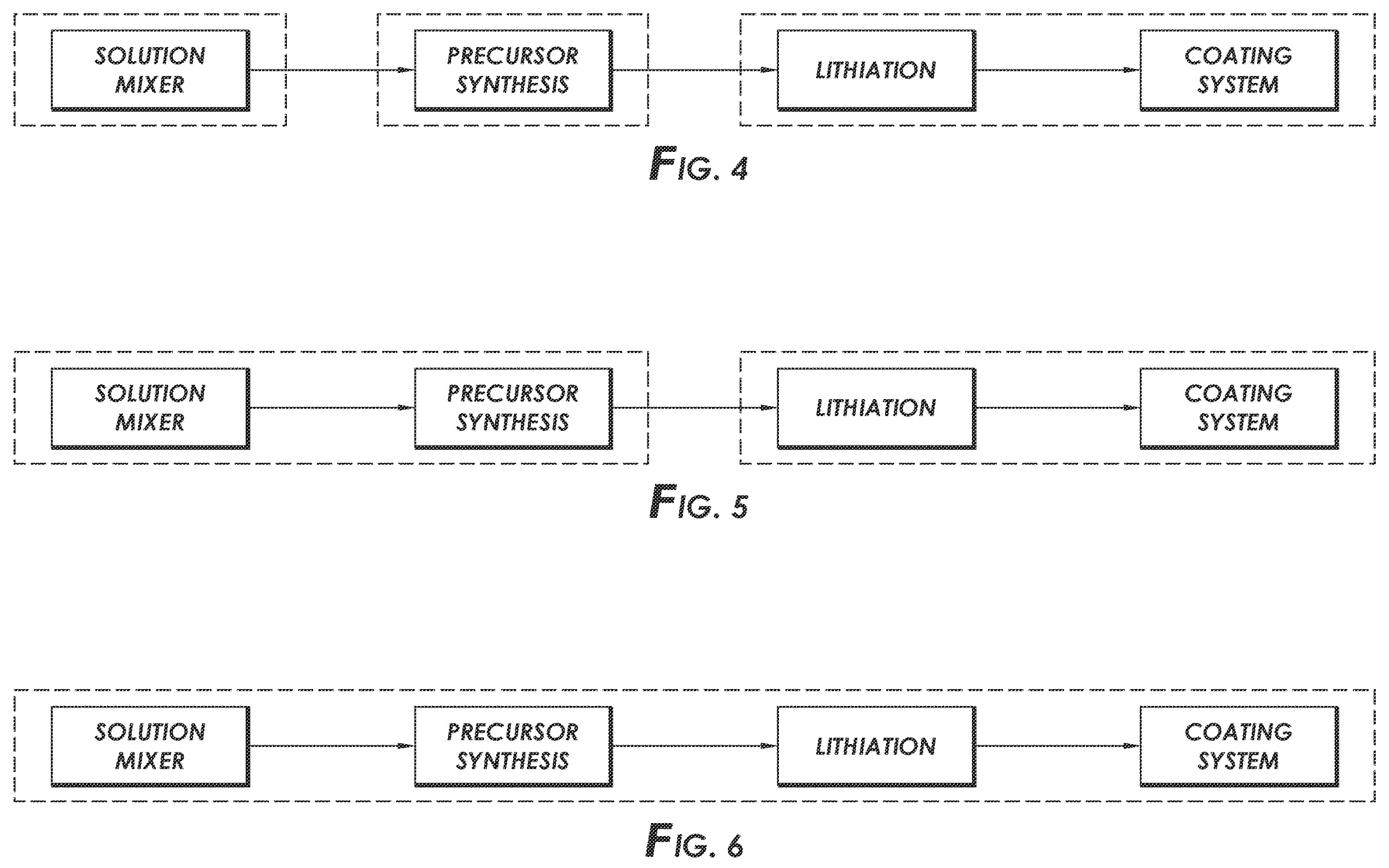

SOLUTION MIXER → PRECURSOR SYNTHESIS → LITHIATION → COATING SYSTEM

*FIG. 4*

SOLUTION MIXER → PRECURSOR SYNTHESIS → LITHIATION → COATING SYSTEM

*FIG. 5*

SOLUTION MIXER → PRECURSOR SYNTHESIS → LITHIATION → COATING SYSTEM

*FIG. 6*

COATED METAL OXIDE MATERIALS AND METHOD, PROCESS, AND APPARATUS FOR MAKING THE SAME

CROSS-REFERENCE TO RELATED APPLICATION(S)

This disclosure claims priority from U.S. Provisional Application No. 63/330,501, filed on Apr. 13, 2022, which is incorporated by reference herein.

TECHNICAL FIELD

This disclosure relates to coated metal oxides, where the coated metal oxides include a metal oxide and coating thereon. This disclosure relates to methods and apparatus for making the coated metal oxides. The coated metal oxides can be used energy storage devices, such as lithium ion batteries, and in ion-exchange technologies, such as for extraction and recovery of lithium.

BACKGROUND

The ever-growing markets of electric vehicles, portable consumer electronics, and grid energy storage escalate the demand for safe and renewable energy storage systems with high energy and longer cycle life. Although Li-ion based batteries (LIBs) have been dominant and recognized for their high energy density, increasing demands on issues like electric vehicle range, battery usage lifetimes, and surges in material price have pushed LIB cathode providers to find pathways towards LIB cathode production that can produce high performing material that is also protected to be durable enough to maintain or exceed electrochemical performance expectations at low cost. One way to protect high-performance cathode material is to introduce a coating which can maintain the surface durability without inhibiting surface conductivity.

However, this coating may need to be uniform, precise, protective, and conductive as to prevent a reduction in electrochemical performance. At the same time, to properly address the surface challenges of evolving cathode materials, this coating must be tunable to the synthesis. One way to accomplish this utilizes atomic layer deposition (ALD), for layer-by-layer controlled deposition, where a chamber with material is sequentially pumped down to vacuum and pulsed with reaction-limited precursor gas under working process conditions. While post-synthesis processing with ALD is technically feasible, in many cases the transfer of material from one system to the other is inefficient for capital and operating expenses. In addition, cost challenges imply that a method is necessary to coat optimally and efficiently using small amounts of precursor gas.

Lithium is an indispensable metal for lithium batteries in various applications including utility-scale energy storage, consumer electronics, and electric transportation in the form of electric vehicles like electric cars, electric trucks, electric boats, electric ships, and electric aviation. Direct lithium extraction from brines is an alternative method to extract and recover lithium metal from diverse brine sources such as geothermal brine, oilfield brine, salar brine, salten sea brine, and other sources. Metal oxide ion exchange materials absorb lithium ions from a liquid resource. Subsequently, they can be induced to release absorbed lithium ions. In some cases, the material is induced to release lithium ions by a swing in pH, using acids like hydrochloric acid, acetic acid, nitric acid, sulfuric acid, formic acid, phosphoric acid, hydrobromic acid, chloric acid, or perchloric acid. Additionally, the ion exchange material can be induced to release lithium ions using gas regeneration, wherein carbon dioxide is pressurized with water and made to contact ion exchange material, forcing a swing in pH and releasing lithium ions. In these ways, the ion exchange process is repeated to extract lithium ions from the liquid resource many times, acting as a battery cathode charging and discharging without the actual transport of charge. In many cases, the metal oxide ion exchange material could be used directly in electrochemical battery applications, like in the case of lithium manganese oxides, as one example. Where in a battery, lithium ions may be shuttled in and out over cycles and remains in the electrolyte, for lithium extraction, the extracted ions are transported in the form of a product stream. Further, the extracted lithium can be further processed into chemical products such as lithium hydroxide and lithium carbonate for lithium battery manufacturing and other industries. In a similar process, ion exchange materials can be designed to extract other valuable minerals like Mg, Ca, Ti, Mn, Co, Ni, Zn, Ba, Sr, Be, Ag, Cs, Rb, K, or Na. The benefits of coating this material can carry over similarly.

Some of the major challenges in direct lithium extraction using a metal oxide ion exchange material include material phase change, dissolution of metal ion species, and degradation of the ion exchange materials especially when an acidic environment is utilized to induce the movement of lithium ions out of the material. Like in other battery cathode materials mentioned above where material durability has a direct impact on cycle life and performance, a coating can be a solution for these dissolution and degradation issues, which affect the cycle life and performance of lithium extraction materials. The coating provides protection to the core material while maintaining and introducing conducting pathways, in which the overall direct lithium extraction process can be substantially benefitted.

There is a need in the art for processes which coat cathode materials and ion-exchange materials at low cost, high flexibility, and high yield to meet the challenges of today's battery and lithium extraction industries. At the same time, there is a need in the art for processes which produce coated cathode materials and ion-exchange materials using an apparatus having a limited number of reactors for enabling low cost, high flexibility, and high yield to be competitive in the market.

BRIEF SUMMARY

This disclosure shows a scalable and commercialize-able method of producing coated metal oxide materials by a combined apparatus for synthesis and coating which shows high efficiency, lower material consumption, and higher coating yield in a continuous process, batch process, or both. This method allows for a tunable in-situ, batch, or continuous coating process.

In some embodiments, a method for making a coated metal oxide in a closed-loop continuous hydrothermal process includes mixing a first metal-containing solution and a first high energy component to facilitate formation of a metal oxide.

In some embodiments, the method further comprises mixing an additional solution forming a coating or a doping on the metal oxide.

In some embodiments, the first high energy component is a supercritical fluid.

In some embodiments, the method further comprises separating the metal oxide formed from a waste fluid, where the waste fluid contains unreacted components from the first metal-containing solution and the first high energy component; and recycling the waste fluid to facilitate formation of additional metal oxide.

In some embodiments, the supercritical fluid comprises at least one of water, a metal-containing compound, a pH controlling agent, a chelating agent, or a ligating agent.

In some embodiments, the first metal-containing solution comprises a metal-containing compound.

In some embodiments, the first metal-containing solution further comprises at least one of water, a pH controlling agent, a chelating agent, or a ligating agent.

In some embodiments, the method further comprises mixing a second metal-containing solution with the first metal-containing solution and first high energy component, where the second metal-containing solution has at least one metal that is different from the first metal-containing solution or includes a material that forms a coating on the metal oxide.

In some embodiments, the method further comprises mixing a second high energy component with the first metal-containing solution and first high energy component, where the second high energy component has at least one metal that is different from the first metal-containing solution or includes a material that forms a coating on the metal oxide.

In some embodiments, forming a coating further comprises depositing one or more atomic layers on a surface of the metal oxide using a metal-containing compound and an oxidizing gas.

In some embodiments, the coating includes at least one of a metal, a polymer, or a conductive material.

In some embodiments, the method further comprises lithiating at least one of the metal oxide or the coating.

In some embodiments, the method further comprises de-lithiating at least one of the metal oxide or the coating.

In some embodiments, a process of making a coating metal oxide in a closed-loop system comprises mixing a first metal-containing solution and a first high energy component to facilitate formation of a metal oxide; and forming a coating on the metal oxide, where the process occurs in one or more reactors.

In some embodiments, the mixing metal-containing solution and high energy component is performed in a first reactor to form a metal oxide, and wherein the coating is formed in a second reactor to form a coated metal oxide.

In some embodiments, the first reactor is an in-line reactor and wherein the second reactor is an in-line reactor.

In some embodiments, the first metal-containing solution, the first high energy component, or a combination thereof is prepared in a third reactor and then flowed to the first or second reactor after preparation.

In some embodiments, where the third reactor is a stirred reactor.

In some embodiments, the mixing metal-containing solution, high energy component, and additional solution are performed in a single reactor to form a coated metal oxide.

BRIEF DESCRIPTION OF DRAWINGS

FIG. 1 is a flow chart of a four-step process for making a coated metal oxide in accordance with some embodiments of the disclosure.

FIG. 2 is a flow chart of a two-step continuous or batch process for making a coated metal oxide in accordance with some embodiments of the disclosure.

FIG. 3 is a flow chart of a one-step continuous or batch process for making a coated metal oxide in accordance with some embodiments of the disclosure.

FIG. 4 is a flow chart of a three-step batch process for making a coated metal oxide in accordance with some embodiments of the disclosure.

FIG. 5 is a flow chart of a two-step batch process for making a coated metal oxide in accordance with some embodiments of the disclosure.

FIG. 6 is a flow chart of a one-pot process for making a coated metal oxide in accordance with some embodiments of the disclosure.

DETAILED DESCRIPTION

Figure 8:
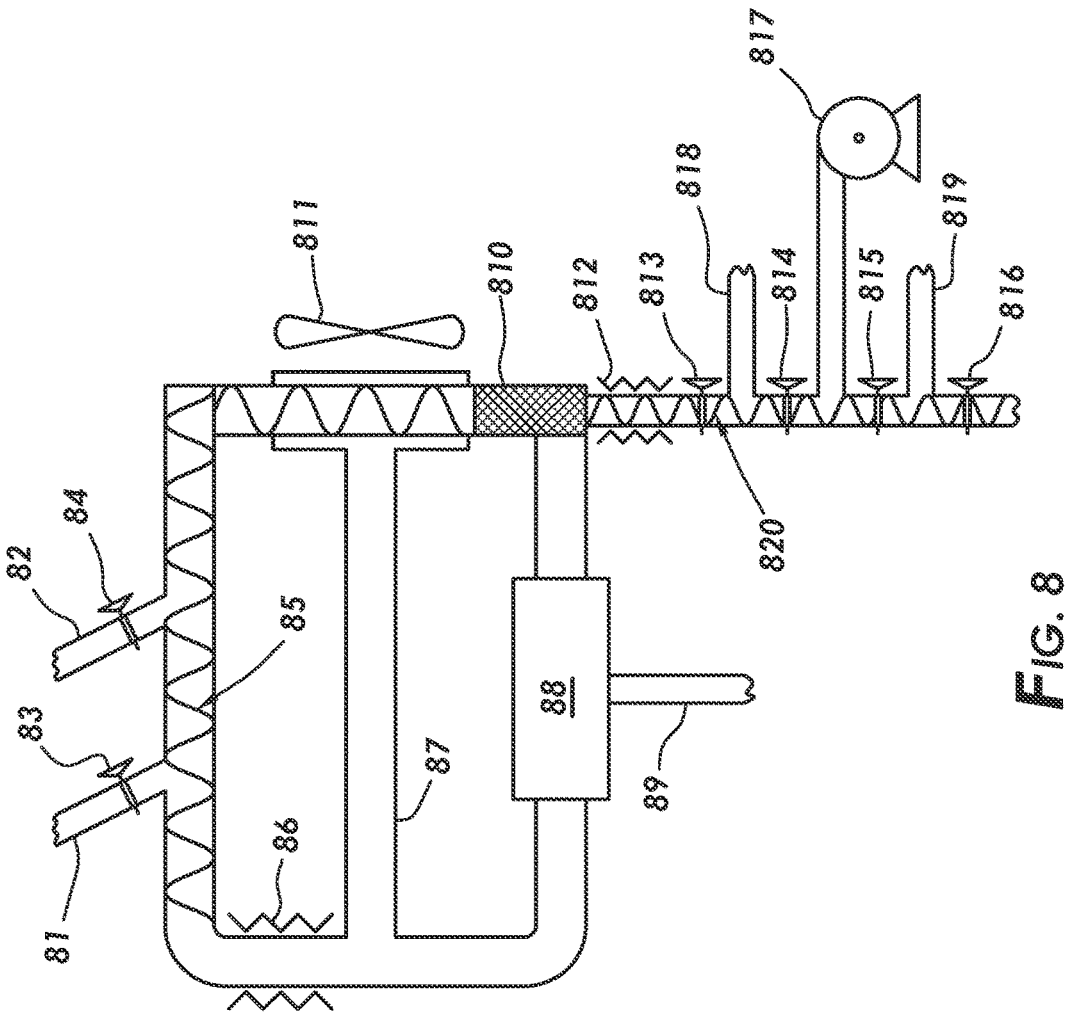
FIG. 8 is a schematic representation of a closed-loop continuous metal oxide manufacturing process in accordance with some embodiments of the disclosure.

Coated metal oxides, methods and apparatus for making the same are disclosed herein.

Coated Metal Oxide

The coated metal oxide includes a metal oxide and a coating thereon. The coating can be disposed on a surface of the metal oxide and may partially or entirely enclose the metal oxide. For example, the coated metal oxide may have a core-shell structure in some embodiments, where the core comprises the metal oxide and the shell comprise the coating. The coating can be in any suitable shape, such as islands or clusters on the surface of the metal oxide or as a continuous layer.

The coating can include one or more of surface doping, where the coating cannibalizes a surface portion of the existing metal oxide, an island and/or cluster coating and/or conformal layer that extends from the surface of the metal oxide. In some embodiments, the coating can have multiple layers, such surface doping layers, layers that extend from the surface of the metal oxide, or combinations thereof. In some embodiments, the coverage of the coating on the metal oxide surface may range from about 50 to about 100 percent. The coating can have a thickness ranging from about 0.2 nm to about 10 nm. The coating may have a crystal structure or amorphous structure.

The metal oxide can have a particle size ranging from about 50 nm to about 100 um in a diameter. The particles can have various shapes of polygons such as trigon, tetragon, pentagon, hexagon, heptagon, octagon, enneagon, decagon, and other polygons with more angles, different shapes of crystals such as rod, bar, cylinder, angled cylinder, rounded cylinder, plane, plate, and other shapes of crystals, and irregular shape of a sphere. The metal oxide can be in the form of a single particle, such as a primary particle, in the form of a secondary particles, where the secondary particles are aggregates of primary particles, or a combination thereof. A single particle or a primary particle may have no crystalline grain boundary, i.e., the particle consists of a single crystallite. In some cases, a single particle or a primary particle may have two or more crystalline grain boundaries, i.e., the particle is polycrystalline.

The metal oxide can be a material suitable as a cathode material for a lithium ion battery or a material for use as an ion exchange materials. Example metal oxides for use as cathode materials include lithium cobalt oxides, lithium manganese oxides, lithium nickel oxides, lithium nickel manganese oxides, lithium nickel cobalt oxides, lithium manganese cobalt oxides, lithium nickel aluminum oxides, lithium cobalt aluminum oxides, lithium manganese aluminum oxides, lithium nickel manganese cobalt oxides, lithium nickel cobalt aluminum oxides, lithium nickel manganese aluminum oxides, lithium nickel cobalt manganese aluminum oxides, lithium iron phosphate, lithium manganese phosphate, lithium iron manganese phosphate, lithium cobalt phosphate, lithium iron cobalt phosphate, lithium iron manganese cobalt phosphate, or combinations thereof. In some embodiments, residual lithium compounds can exist on the surface of above listed cathode materials. For example, residual lithium compounds can include lithium carbonate, lithium hydroxide, lithium chloride, lithium oxide, lithium fluoride, lithium sulfate, lithium nitrate, other forms of lithium-containing chemicals, or combinations thereof. The residual compounds may have a crystal structure, an amorphous structure, or combinations thereof.

Example metal oxides can be a cathode precursor with no or little lithium in it to be utilized for synthesizing a cathode material. Metal oxides for use as cathode precursors include cobalt oxides, manganese oxides, titanium oxides, nickel oxides, manganese titanium oxides, nickel manganese oxides, nickel cobalt oxides, manganese cobalt oxides, nickel titanium oxides, nickel aluminum oxides, cobalt aluminum oxides, manganese aluminum oxides, nickel manganese cobalt oxides, nickel cobalt aluminum oxides, nickel manganese aluminum oxides, nickel cobalt manganese aluminum oxides, iron phosphate, manganese phosphate, iron manganese phosphate, cobalt phosphate, iron cobalt phosphate, iron manganese cobalt phosphate, aluminum oxides, aluminum hydroxides, or combinations thereof. Metal oxides for cathode precursors can include one or more residual lithium compounds as disclosed herein.

Example metal oxides suitable as ion exchange materials include lithium cobalt oxides, lithium manganese oxides, lithium titanium oxides, lithium nickel oxides, lithium manganese titanium oxides, lithium nickel manganese oxides, lithium nickel cobalt oxides, lithium manganese cobalt oxides, lithium nickel titanium oxides, lithium nickel aluminum oxides, lithium cobalt aluminum oxides, lithium manganese aluminum oxides, lithium nickel manganese cobalt oxides, lithium nickel cobalt aluminum oxides, lithium nickel manganese aluminum oxides, lithium nickel cobalt manganese aluminum oxides, lithium iron phosphate, lithium manganese phosphate, lithium iron manganese phosphate, lithium cobalt phosphate, lithium iron cobalt phosphate, lithium iron manganese cobalt phosphate, lithium aluminum oxides, lithium aluminum hydroxides, or combinations thereof. In some embodiments, residual lithium compounds can exist on the surface of above listed ion exchange materials. For example, residual lithium compounds can include lithium carbonate, lithium hydroxide, lithium chloride, lithium oxide, lithium fluoride, lithium sulfate, lithium nitrate, other forms of lithium-containing chemicals, and combinations thereof that may have a crystal structure, an amorphous structure, or combinations thereof. In some embodiments, the above-listed ion exchange materials are de-lithiated as to cobalt oxides, manganese oxides, titanium oxides, nickel oxides, manganese titanium oxides, nickel manganese oxides, nickel cobalt oxides, manganese cobalt oxides, nickel titanium oxides, nickel aluminum oxides, cobalt aluminum oxides, manganese aluminum oxides, nickel manganese cobalt oxides, nickel cobalt aluminum oxides, nickel manganese aluminum oxides, nickel cobalt manganese aluminum oxides, iron phosphate, manganese phosphate, iron manganese phosphate, cobalt phosphate, iron cobalt phosphate, iron manganese cobalt phosphate, aluminum oxides, aluminum hydroxides, or combinations thereof.

Example materials for the coating can include carbon, metal, metal oxide, polymer, and other materials. Examples of carbon include amorphous carbon, carbon black, acetylene black, ketjen black, conductive carbon, polymer carbon residue, conductive graphite, graphite, natural graphite, artificial graphite, expandable graphite, synthetic graphite, graphite oxides, graphene oxides, graphene, crumpled graphene, a few layers of graphene, several layers of graphene, multi-walled carbon nanotubes, single-walled carbon nanotubes, carbon fiber, carbon nanofiber, or combinations thereof. Example metals include aluminum, titanium, cobalt, nickel, copper, silicon, germanium, selenium, zirconium, niobium, tungsten, gallium, lithium, magnesium, strontium, barium, iron, hafnium, ruthenium, tantalum, vanadium, yttrium, manganese, and other metals. Example metal oxides include aluminum oxides, titanium oxides, cobalt oxides, nickel oxides, copper oxides, silicon oxides, germanium oxides, selenium oxides, zirconium oxides, niobium oxides, tungsten oxides, gallium oxides, lithium oxides, magnesium oxides, strontium oxides, barium oxides, iron oxides, hafnium oxides, ruthenium oxides, tantalum oxides, vanadium oxides, yttrium oxides, manganese oxides, and other metal oxides. The coating can include combinations of two or more of the coating materials disclosed herein.

Method

A method of producing a coated metal oxide includes synthesis of a metal oxide from metal-containing precursors and coating the metal oxide to form a coated metal oxide.

Example synthesis methods include co-precipitation synthesis method, hydrothermal synthesis method, wet solid state synthesis method, dry solid state synthesis method, plasma synthesis method, molten salt synthesis method, sol-gel synthesis method, combustion synthesis method, and other synthesis methods.

Example coating methods includes atomic layer deposition, plasma atomic layer deposition, chemical vapor deposition, pulsed laser deposition, physical vapor deposition, wet chemical method, dry chemical method, wet mixing method, dry mixing method, wet solid-state method, and dry solid-state method.

In some embodiments, a method of producing a coated metal oxide includes mixing a metal-containing solution and a high energy component to form a metal oxide and depositing a coating on the metal oxide to form a coated metal oxide.

The metal-containing solution can include a metal-containing compound. The metal-containing solution can include a chelating agent, a complexing agent, a pH controlling agent, a ligating agent, and combinations thereof. The metal-containing solution can include a material for coating to form a metal oxide and the coating on the surface in one reaction. The metal-containing solution can be an aqueous solution. The metal-containing solution can be prepared at a temperature ranging from about 1° C. to about 200° C. The metal-containing solution can be prepared at a pressure ranging from about 0.1 bar to about 500 bar.

The metal-containing compound can include cations of Al, Ti, Co, Ni, Cu, Si, Ge, Se, Zr, Nb, W, Sn, Ga, Li, Mg, Sr, Ba, Fe, Hf, Ru, Ta, C, V, Y, B, F, Na, Ca, Sc, P, S, Cr, Mn, Zn, Sr, Mo, Ag, Au, In, Sb, Ba, La, W, Bi, or combinations thereof, and an anion of hydroxide, carbonate, sulfate, nitrate, chloride, oxide, fluoride, oxyhydroxide, halide, acetate, oxalate, citrate, or combinations thereof.

The chelating agent can include lithium hydroxide, sodium hydroxide, potassium hydroxide, sodium bicarbonate, oxalic acid, or combinations thereof. The complexing agent can include polyacrylamide, phosphates, phosphonates, polycarboxylates, zeolites, acetic acids, citric acid, chloric acids, lactic acids, crown ethers, ethylenediamine, ethylenediamine tetra acetic acid, ethylene glycol tetra acetic acid, and glycine, ammonium hydroxide, ferric acetylacetonate, ammonium ferric oxalate, ketone, or combinations thereof.

The pH controlling agent can include an acidic compound, a basic compound, or combinations thereof. The acidic compound can include acetic acid, sulfuric acid, hydrochloric acid, nitric acid, carbonic acid, citric acid, acetylsalicylic acid, oxalic acid, or combinations thereof. The basic compound can include ammonia, sodium hydroxide, potassium hydroxide, ammonium hydroxide, aluminum hydroxide, magnesium hydroxide, calcium hydroxide, lithium hydroxide, barium hydroxide, sodium bicarbonate, sodium carbonate, or combinations thereof.

The ligating agent can include lithium hydroxide, sodium hydroxide, potassium hydroxide, ammonium hydroxide, sodium bicarbonate, oxalic acid, or combinations thereof.

The high energy component can include a supercritical fluid, plasma, a molten salt, or combinations thereof. The supercritical fluid can include carbon dioxide, methane, ethane, propane, R134A, ethylene, ammonia, argon, nitrogen, neon, hydrogen, water or combinations thereof. The supercritical fluid can be mixed with a chelating agent, a complexing agent, a pH controlling agent, a ligating agent, or combinations thereof at a supercritical state or under a supercritical state (which can be also called a subcritical state). The supercritical fluid can be prepared at a temperature and pressure necessary to achieve a supercritical condition of the fluid. The temperature of the supercritical fluid can range at a temperature from about 100° C. to about 500° C. The pressure of the supercritical fluid can range from about 0.1 bar to about 500 bar.

The mixing of the metal-containing solution and the high energy component can initiate formation of a metal oxide. The mixing can initiate a crystallization reaction to form a metal oxide. In one embodiment, the supercritical fluid is mixed with the metal-containing solution to transition the metal-containing solution to a supercritical state in a short period of time. The time period may range between about 0.1 and about 48 hours. The time period may be adjusted depending on the crystal size targeted to manufacture. In some embodiments, a transition to the supercritical state can initiate formation of the metal oxide. The mixture can be under supercritical or subcritical state depending on the temperature, pressure, and the chemicals dissolved in the metal-containing solution and the supercritical fluid. To adjust the solubility of the metal compounds in the solution, a supercritical state can be used when the solubility of the metal compounds in the solution is low and subcritical state can be used when the solubility of the metal compounds in the solution is high. In some embodiments, a transition to the subcritical state can initiate formation of the coating on the metal oxide or doping of the surface of the metal oxide or both.

The mixing can include in-line mixing, stirring, magnetic stirring, magnetic rotating, mixing, shear mixing, blade mixing, vibrating, shaking, rolling, milling, ball milling, ultrasonic, perturbating, air jet, air flow, and other mechanical mechanisms. The reactor can have a tube shape which may be cylindrical, circular, triangular, rectangular, hexagonal, pentagonal, heptagonal, octagonal, or other types of angled-tube shapes and combinations thereof to facilitate the mixing behavior and performance. The wall of the reactor can be baffled, patterned, carved, shaped, engraved, bumped, have other types of regular and irregular shapes, or combinations thereof to facilitate mixing and performance.

The mixture may flow through a reactor, which could include a tubular reactor, stirred reactor, non-stirred reactor, in-line reactor, or combinations thereof, which are under a supercritical condition or under a subcritical condition. The supercritical or subcritical condition may have a temperature ranging between −40° C. and 500° C. The supercritical or subcritical condition may have a pressure range between 1 and 500 bar. In one embodiment, a supercritical fluid is being injected into the metal-containing solution to create a supercritical state in the mixture where the reactor can be set to maintain the supercritical state in the mixture. In one embodiment, the reactor can be set to increase the temperature and pressure to enable the metal-containing solution to be at a higher energy condition to reduce the solubility lower, or where the reactor being set to decrease the temperature and pressure to convert the prior supercritical state from the supercritical fluid injection into a subcritical state to increase the solubility higher, or combinations thereof. One or more supercritical fluid injections can be combined with one or more reactors with different temperature and pressure conditions to form a various metal oxides with coatings with different structures such as single layer coating, multi-layer coatings, core-shell, gradient, multi-core-shell structures.

One or more additional solutions may be added to the mixture during a synthesis process of the metal oxide or to coati a coating on the metal oxide being formed. For example, the additional solution may include a metal-containing solution to provide additional metal and/or a different metal to the synthesis process. For example, the additional solution may include a coating material to form a coating on the metal oxide being formed. Through the use of an additional solution, the temperature and/or pressure can be adjusted. In some embodiments, an additional solution can be used to lower the temperature and/or pressure of the mixture in the reactor. After including an additional solution, the mixture may flow through a reactor, which is under a supercritical or a subcritical condition at a temperature range between −40° C. and 500° C. and a pressure range between 1 bar and 500 bar. By controlling the temperature and/or the pressure by combination with another solution, the mixture in the reactor can be controlled to be at a supercritical state or subcritical state since different materials in the mixture require different temperatures and/or pressures to reach a supercritical state. Use of an additional solution can control solubility of a material in the mixture in the reactor to provide a condition (e.g., a supercritical condition or a subcritical condition) at a specific process step to obtain a desired outcome, such as a desired chemical structure, composition, particle morphology, particle size, coating, doping, or combinations thereof.

One or more additional high energy components such as metal-containing or carbon-containing solution, or combinations thereof at a supercritical state may be added to the mixture during a synthesis process of the metal oxide or to coat a coating on the metal oxide being formed. For example, the additional high energy component may include a metal-containing compound to provide additional metal and/or a different metal to the synthesis process. For example, an additional metal-containing solution at a supercritical state may include a coating material to form a metal oxide coating on the metal oxide being formed. For example, an additional carbon-containing solution at a supercritical state may include a coating material to form a carbon coating on the metal oxide being formed. Though the use of an additional high energy component, the temperature and/or pressure of the mixture in the reactor can be controlled. In some embodiments, the additional high energy component can raise the temperature and/or pressure of a mixture in the reactor. After an addition of the additional high energy component, the mixture may flow through a reactor, which could include a tubular reactor, stirred reactor, non-stirred reactor, in-line reactor, and combinations thereof, which are under a supercritical condition. In some embodiments, a supercritical condition can be at a temperature range between 100° C. and 500° C. and a pressure range between 1 bar and 500 bar.

On the other hand, one or more additional low energy components such as metal-containing or carbon-containing solution, or combinations thereof at a subcritical state may be added to the mixture during a synthesis process of the metal oxide or to coat a coating on the metal oxide being formed. For example, an additional low energy component may include a metal-containing compound to provide additional metal and/or a different metal to the synthesis process. For example, an additional metal-containing solution at a subcritical state may include a coating material to form a metal oxide coating on the metal oxide being formed. For example, an additional carbon-containing solution at a subcritical state may include a coating material to form a carbon coating on the metal oxide being formed. Though the use of an additional low energy component, the temperature and/or pressure can be controlled. In some embodiments, an additional low energy component can be used to lower the temperature and/or pressure of the mixture in the reactor. After an addition of an additional low energy component, the mixture may flow through a reactor, which could include a tubular reactor, stirred reactor, non-stirred reactor, in-line reactor, and combinations thereof, which are under a subcritical condition. In some embodiments, a subcritical or near-supercritical condition can be at a temperature range between −40° C. and 500° C. and a pressure range between 1 bar and 500 bar. By controlling the temperature and/or the pressure by combination with another solution, the mixture in the reactor can be controlled to be at a supercritical state or subcritical state since different materials in the mixture require different temperatures and/or pressures to reach a supercritical state. Use of an additional solution can control solubility of a material in the mixture in the reactor to provide a condition (e.g., a supercritical condition or a subcritical condition) at a specific process step to obtain a desired outcome, such as a desired chemical structure, composition, particle morphology, particle size, coating, doping, or combinations thereof.

After formation of the metal oxide or a coated metal oxide using the methods disclosed herein, the method can include lithiation of the metal oxide or coated metal oxide and/or deposition or further deposition of a coating on the metal oxide or coated metal oxide. The lithiation and coating steps can be performed in any order and can be performed one or more times to achieve a desired result, such as a desired content of lithium in the metal oxide or desired thickness and/or coverage of the coating.

The lithiation step can include a batch hydrothermal process, a continuous hydrothermal process, annealing process, or combinations thereof. The lithiation step may include mixing with lithium-containing chemicals such as lithium carbonate, lithium hydroxide, lithium chloride, lithium oxide, lithium fluoride, lithium sulfate, lithium nitrate, and other forms of lithium chemicals, and reacting with the metal oxide or coated metal oxide under hydrothermal or annealing processes. The hydrothermal process can be at a temperature range between 100° C. and 500° C. The hydrothermal process can be at a pressure range between 1 bar and 500 bar in oxygen, nitrogen, argon, air atmosphere or combinations thereof. The annealing process can be at a temperature range between 100° C. and 1200° C. The annealing process can be in oxygen, nitrogen, argon, air atmosphere or combinations thereof.

The coating step can include one or more coating methods for deposition of the coating. The coating method can include atomic layer deposition (ALD), chemical vapor deposition, pulsed laser deposition, and physical vapor deposition, wet chemical mixing, dry chemical mixing, dry coating, carbon coating, and polymer coating.

Atomic Layer Deposition

Atomic layer deposition (ALD) includes dosing a metal precursor in combination with a gas to the metal oxide to form a coating on the surface of the metal oxide. The coating can have a thickness in a range of 0.2 nm and 10 nm. The gas can include water ($H_2O$), ozone ($O_3$), or any suitable oxygen-containing gas to oxidize the surface of the metal oxide. The metal precursors comprise Al, Ti, Co, Ni, Cu, Si, Ge, Se, Zr, Nb, W, Sn, Ga, Li, Mg, Sr, Ba, Fe, Hf, Ru, Ta, C, V, Y, B, F, Na, Ca, Sc, P, S, Cr, Mn, Zn, Sr, Mo, Ag, Au, In, Sb, Ba, La, W, Bi, or combinations thereof. The dosing can be performed for one or more cycles to achieve a desired coverage or layer thickness. The deposition temperature can range from about 20° C. to about 400° C. Each dose can be administered for about 0.05 seconds to about 60 seconds. The exposure time may range from about 1 to about 3600 seconds. The chamber may be purged between each dosage or periodically. In some embodiments, the atomic layer deposition method includes an agitation mechanism for agitating the metal oxide as the ALD is performed.

The agitation mechanism includes vibrating, shaking, rolling, milling, stirring, mixing, ultrasonic, perturbating, air jet, liquid jet, air flow, liquid flow, and other mechanical mechanisms. An example agitation mechanism is a ball-milling mechanism including a rotating reactor with a plurality of balls, wherein the plurality of balls comprises one or more of $ZrO_2$, $TiO_2$, stainless steel, and $Al_2O_3$. An example agitation mechanism is a mechanical stirring mechanism including a blade with a shape of screws, screw conveyors, mixing blades, stirring blades, grading blades, tees, rods, bars, a rod with thorns, or combinations thereof. An example agitation mechanism is an air jet or air flow mechanism including a nozzle that injects a gas including air, $N_2$, $O_2$, Ar, or combinations thereof.

One example ALD method is an in-line ALD method using a powder delivering mechanism and an agitation mechanism. The powder delivering mechanism can include a gravity driven delivery mechanism with an agitation mechanism including vibrating, shaking, rolling, milling, ball milling, stirring, magnetic stirring, magnetic rotating, mixing, ultrasonic, perturbating, air jet, air flow, and other mechanical mechanisms including a powder transferring mechanism with a screw conveyor, or a combination thereof. The powder delivering mechanism may include an agitation mechanism to transfer the dry powder beyond the inertia from gravity through a tube or pipe from one step to another. An agitation mechanism can be used for purposes such as to increase the exposure of dry powder in the ALD chamber to the metal precursors.

Wet Chemical Mixing

Wet chemical mixing can include mixing a metal-containing solution with the metal oxide, drying the mixture, and heat treating the dried mixture to form the coating. The drying step can be performed at a temperature between about 40° C. to about 600° C. The heat treatment step can be performed at a temperature between about 100° C. to about 1200° C. in oxygen, nitrogen, air, argon atmosphere or combinations thereof.

The metal-containing solution can include a metal-containing chemical and a solvent. The solvent includes water, ethanol, acetone, acetonitrile, isopropanol, methanol, NMP, other aqueous and/or non-aqueous solvents, or combinations thereof. The metal-containing chemicals includes Al, Ti, Co, Ni, Cu, Si, Ge, Se, Zr, Nb, W, Sn, Ga, Li, Mg, Sr, Ba, Fe, Hf, Ru, Ta, C, V, Y, B, F, Na, Ca, Sc, P, S, Cr, Mn, Zn, Sr, Mo, Ag, Au, In, Sb, Ba, La, W, Bi, or combinations thereof. The metal-containing chemical can include a metal hydroxide, metal carbonate, metal sulfate, metal nitrate, metal chloride, metal oxide, metal fluoride, metal oxyhydroxide, metal halide, metal acetate, metal oxalate, metal citrate, and combination thereof.

In some embodiments, wet chemical mixing can include a mixing with coating materials in water, then the mixture is cooled, filtered, and dried at a temperature between about 40° C. to about 600° C. Because the wet chemical mixing is done in water, this coating method can be integrated with a batch or continuous hydrothermal manufacturing process to produce a coated metal oxide in the combined process.

In some embodiments, wet chemical mixing can include a continuous or batch hydrothermal reaction where the metal-containing solution is prepared by dissolving the metal-containing chemicals into the solvent under a reaction pressure between about 1 and about 400 bar, mixing the solution with the metal oxide under a reaction pressure between about 1 and about 400 bar where the mixture can be at a temperature between about 20° C. and about 1000° C., cooling the mixture, and filtering and drying at a temperature between about 40° C. to about 600° C.

A solution delivering mechanism may be used in the wet chemical method when solid content in the metal-containing solution is sufficiently high enough to make delivery by injection difficult, and/or if solids settle and prevent flow. The solution delivering mechanism can include a gravity driven delivery mechanism with an agitation mechanism including vibrating, shaking, rolling, milling, ball milling, stirring, mixing, ultrasonic, perturbating, air jet, air flow, and other mechanical mechanisms including a solid transferring mechanism with a screw conveyor, or combinations thereof.

Carbon Coating

A carbon coating method or conductive coating method can include mixing the metal oxide and carbon-containing compounds and/or conductive compounds, drying the mixture, and annealing the dried mixture. The mixture can be in the form of an aqueous or non-aqueous solution. Drying can be performed at a temperature between about 40° C. to about 600° C. Annealing can be performed at a temperature between about 50° C. to about 1200° C. The annealing atmosphere can include air, $O_2$, $N_2$, Ar, or combinations thereof.

Conductive material can be provided alternatively or in addition to the carbon-containing compounds. The conductive material can include a metal and/or ceramic. The metal can include W, Ti, Sn, Cu, Al, and/or other conductive metals. The ceramic can include $PbO_2$, $RuO_2$, TiN, $TiB_2$, $MoSi_2$, n-$BaTiO_3$, $Fe_2O_3$, $Ti_2O_3$, $ReO_3$, $IrO_2$, yttrium barium copper oxides, and/or other conductive ceramics.

The carbon-containing compounds can include glucose, sucrose, ethyl cellulose, nitrocellulose, polypyrrole, polyaniline, poly(3,4-ethylenedioxythiophene), polyvinylidene fluoride, polytetrafluoroethylene, polyethylene oxides, carboxymethyl cellulose, amorphous carbon, carbon black, acetylene black, ketjen black, conductive carbon, polymer carbon residue, conductive graphite, graphite, natural graphite, artificial graphite, expandable graphite, synthetic graphite, graphite oxides, graphene oxides, graphene, crumpled graphene, a few layers of graphene, several layers of graphene, multi-walled carbon nanotubes, single-walled carbon nanotubes, or combinations thereof.

In some embodiments, carbon coating can include a continuous or batch hydrothermal reaction where an aqueous or non-aqueous carbon-containing solution is prepared by dissolving the carbon-containing compound (and/or a conductive material) in a solvent under a reaction pressure between about 1 and about 400 bar, mixing the solution with the metal oxide under a reaction pressure between about 1 and about 400 bar where the mixture can be at a temperature between about 20° C. and about 1000° C., cooling the mixture, filtering, and drying at a temperature between about 40° C. to about 600° C. A solution delivering mechanism may be provided if needed as discussed above.

Polymer Coating

A polymer coating method can include depositing a polymer coating on the metal oxide using atomic layer deposition, wet chemical mixing, continuous or batch hydrothermal reaction, or the like.

In one embodiment, a polymer coating can include conductive polymers and/or binder polymers. Conductive polymers can include, but are not limited to, polypyrrole, polyaniline, and/or poly(3,4-ethylenedioxythiophene). Binder polymers can include, but not limited to, polyvinylidene fluoride, polytetrafluoroethylene, polyethylene oxides, ethyl cellulose, nitrocellulose, and/or carboxymethyl cellulose. The conductive coating can further include additives, such as carbon nanotubes, graphene, conductive carbon, Cu, Ag, Au, Pt, and Os In one embodiment, a coating method with a conductive polymer and additive includes dissolving a surfactant in a solvent by stirring for 1 min to 24 hours, at a temperature of between 10° C. and 50° C. depending on solubility, mixing the conductive polymer into a solution for 1 min to 24 hours at a temperature between 40° C. and 120° C., drying at a temperature of between 80° C. and 600° C. for 6 to 24 hours, and collecting the coated powder by using filtration and washing. The surfactant can comprise one or more of sodium dodecyl sulfonate, benzalkonium chloride, cocamidopropyl betaine, polyvinylpyrrolidone, polyurethane, polystyrene, polyvinylidene fluoride, cetyl alcohol, polytetrafluoroethylene, ethyl cellulose, nitrocellulose, and carboxymethyl cellulose. The solvent can comprise one or more of N-methyl-2-pyrrolidinone, ethanol, isopropyl alcohol, acetone, dimethyl carbonate, diethyl carbonate, and ethyl-methyl carbonate.

In some embodiments, a polymer coating method includes dissolving one or more polymer-containing chemicals in a solvent, mixing the solution with the metal oxide, drying at a temperature between 40 to 600° C., and conducting a heat treatment at temperature between 100 to 1200° C. in air, $O_2$, $N_2$, Ar, or combinations thereof. One or more conductive additives may be added to the solvent if needed.

In some embodiments, a polymer coating method includes a continuous or batch hydrothermal reaction where an aqueous or non-aqueous carbon-containing solution is prepared by dissolving one or more polymer-containing chemicals in a solvent under a reaction pressure between about 1 and about 400 bar, mixing the solution with the metal oxide under a reaction pressure between about 1 and about 400 bar where the mixture can be at a temperature between about 20° C. and about 1000° C., cooling the mixture, filtering and drying at a temperature between about 40° C. to about 600° C. A solution delivering mechanism may be provided if needed as discussed above.

The polymer-containing chemicals include, but are not limited to, polypyrrole, polyaniline, poly(3,4-ethylenedioxythiophene), polyvinylidene fluoride, polytetrafluoroethylene, polyethylene oxides, ethyl cellulose, nitrocellulose carboxymethyl cellulose and combination thereof.

The conductive additives include, but are not limited to, carbon nanotubes, graphene, conductive carbon, Cu, Ag, Au, Pt, Os, W, Ti, Sn, Cu, Al, $PbO_2$, $RuO_2$, TiN, $TiB_2$, $MoSi_2$, n-$BaTiO_3$, $Fe_2O_3$, $Ti_2O_3$, $ReO_3$, $IrO_2$, yttrium barium copper oxides, and combinations thereof.

Dry Coating Method

Dry mixing coating or solid-state mixing can be done by adding stoichiometric quantities of a metal precursor to the uncoated powder material followed by a mixing process comprising one of crushing, grinding, mortar and pestle, milling, ball-milling, wherein the metal precursors comprise one or more of Al, Ti, Co, Ni, Cu, Si, Ge, Se, Zr, Nb, W, Sn, Ga, Li, Mg, Sr, Ba, Fe, Hf, Ru, Ta, C, V, Y, B, F, Na, Ca, Sc, P, S, Cr, Mn, Zn, Sr, Mo, Ag, Au, In, Sb, Ba, La, W, Bi, or combinations thereof. The metal precursor can include a metal hydroxide, metal carbonate, metal sulfate, metal nitrate, metal chloride, metal oxide, metal fluoride, metal oxyhydroxide, metal halide, metal acetate, metal oxalate, metal citrate, and combination thereof. After mixing, the mixture may undergo high temperature annealing in a range between 100° C. and 1200° C.

Dry mixing can include drying mixing a metal precursor with the metal oxide, and heat treating the mixture to form the coating. The dry mixing process can include crushing, grinding, mortar and pestle, milling, and/or ball-milling. The heat treatment step can be performed at a temperature between about 100° C. and about 1200° C. The heat treatment can be performed in air. $O_2$, $N_2$, Ar, or combinations thereof. The metal precursors comprise one or more of Al, Ti, Co, Ni, Cu, Si, Ge, Se, Zr, Nb, W, Sn, Ga, Li, Mg, Sr, Ba, Fe, Hf, Ru, Ta, C, V, Y, B, F, Na, Ca, Sc, P, S, Cr, Mn, Zn, Sr, Mo, Ag, Au, In, Sb, Ba, La, W, Bi, or combinations thereof. The metal precursor can include a metal hydroxide, metal carbonate, metal sulfate, metal nitrate, metal chloride, metal oxide, metal fluoride, metal oxyhydroxide, metal halide, metal acetate, metal oxalate, metal citrate, and combination thereof.

Other Method Steps

De-Lithiation

Other method steps can be included depending on the coated metal oxide being made. For example, for coated metal oxide being used as an ion-exchange material, a de-lithiation step can be used to remove lithium from the coated metal oxide. The removal of lithium from the metal oxide can create sites in the metal oxide that can be later utilized to extract lithium from another material or solution. Lithium can be removed by an acid etching treatment where the metal oxide is exposed to acidic conditions to remove lithium.

The method need not be limited to the removal of lithium and may be application dependent. For example, if the targeted extraction species is a metal other than lithium, then that metal could be removed from the metal oxide to create sites on the metal oxide that can be later utilized to extract the target species from another material or solution.

An example of direct lithium extraction process is to extract and recover lithium metal from diverse brine sources such as geothermal brine, oilfield brine, salar brine, salten sea brine, and other sources. A metal oxide ion exchange material absorbs lithium ions from a liquid resource. Subsequently, the material can be induced to release absorbed lithium ions. In these ways, the ion exchange process is repeated to extract lithium ions from the liquid resource many times, acting as a battery cathode charging and discharging without the actual transport of charge.

In some examples, the material is induced to release lithium ions by a swing in pH, using acids like hydrochloric acid, acetic acid, nitric acid, citric acid, sulfuric acid, formic acid, phosphoric acid, hydrobromic acid, chloric acid, or perchloric acid.

In other examples, the ion exchange material can be induced to release lithium ions using gas regeneration, wherein carbon dioxide is pressurized with water and made to contact ion exchange material, forcing a swing in pH and releasing lithium ions.

Example embodiments may include the procedures that the extracted lithium can be further processed into chemical products such as lithium hydroxide and lithium carbonate for lithium battery manufacturing and other industries.

In a similar process, ion exchange materials can be designed to extract other valuable minerals like Mg, Ca, Ti, Mn, Co, Ni, Zn, Ba, Sr, Be, Ag, Cs, Rb, K, or Na. The benefits of coating these ion-exchange materials can carry over similarly.

Encapsulation Method

In producing an ion-exchange material, the method can include an encapsulation step wherein the coated or uncoated metal oxide further undergoes synthesis to trap the metal oxide in a more useful and industrially compatible format. For example, an encapsulation step can include mixing a coated or uncoated metal oxide, a solvent, one or more monomers, an initiator, a cross linking agent, and a porogen, and heating to polymerize the one or monomers to encapsulate the coated or uncoated metal oxide in a polymeric material. In some embodiments, the polymeric material may have targeted metal ions or a structure capable of capturing targeted metal ions.

Coating During Synthesis of the Metal Oxide

As discussed herein, a metal-containing solution and/or high energy component can include coating materials which can be provided during or immediate after the synthesis of the metal oxide and prior to the deposition step. For example, the metal-containing solution and/or high energy component can include any of the coating materials discussed herein, such as metal-containing materials, carbon-containing materials, polymer-containing materials, metal precursors and the like.

Process and Apparatus

A process of making the coated metal oxide can include single or multiple process reactors described herein. As used herein, the term 'reactor' may be a standalone reactor or may be a portion or zone of another piece of equipment such as a pipe or a tank. Example process of making the coated metal oxide includes batch hydrothermal process, closed-loop continuous hydrothermal process, open-loop continuous hydrothermal process and combinations thereof.

Figure 7:
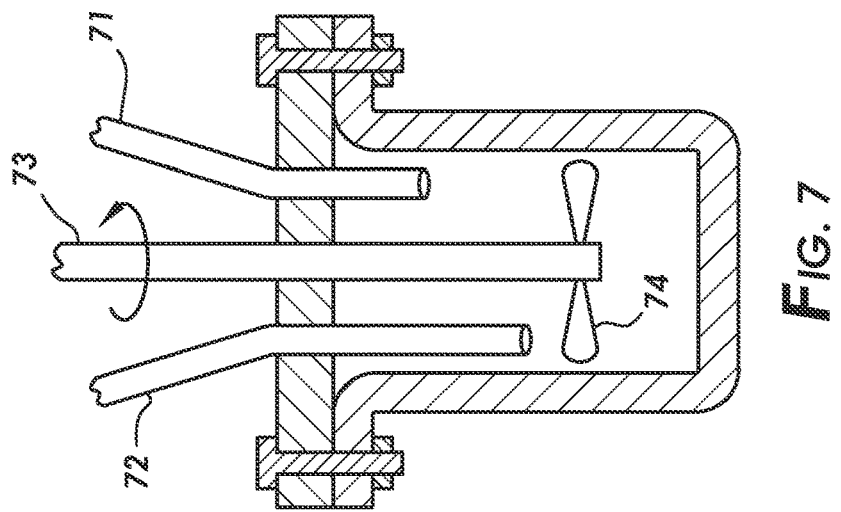
FIG. 7 is schematic representation of a batch reactor in accordance with some embodiments of the disclosure.

Example apparatus of a batch hydrothermal process to produce a coated metal oxide is displayed in FIG. 7. Example apparatus of a closed-loop continuous hydrothermal process to produce a coated metal oxide is displayed in FIG. 8.

An integrated metal oxide synthesis and coating in a process and in an apparatus substantially reduces the cost of the products. ALD processes have been considered a cost-intensive process, but combining the ALD process into the metal oxide synthesis reduces the capital expenses substantially, resulting in cheaper overall cost of production. A continuous process has a higher production rate compared to a batch process for ALD coating as well as hydrothermal metal oxide synthesis process. Further, a closed-loop continuous hydrothermal process has lower material consumption and higher energy efficiency by utilizing waste heat, wastewater, and residual materials, resulting in environmental advantages as well as lower operating costs, compared to an open-loop continuous hydrothermal process.

FIG. 1 depicts a coated metal oxide production process that is a continuous or batch process including a four-step continuous or batch metal oxide production process where each process step occurs in an individual reactor. As depicted by the flow chart in FIG. 1, chemical mixing is performed in a first reactor, followed by precursor synthesis in a second reactor, followed by lithiation in a third reactor, followed by coating in a fourth reactor.

In some embodiments, a coated metal oxide production process can be a continuous or batch process including a two-step continuous or batch metal oxide production process where chemical mixing precursor synthesis and lithiation occur in a first reactor, followed by coating in a second reactor as depicted by the flowchart in FIG. 2.

In some embodiments, a coated metal oxide production process can be a continuous or batch process including a one-step continuous or batch metal oxide production process where chemical mixing precursor synthesis, lithiation, and coating occur in a first reactor as depicted by the flowchart in FIG. 3.

In some embodiments, a coated metal oxide production process can be a batch process including a three-step batch metal oxide production process where chemical mixing occurs in a first reactor, followed by precursor synthesis in a second reactor, followed by lithiation and coating in a third reactor as depicted by the flowchart in FIG. 4.

In some embodiments, a coated metal oxide production process can be a batch process including a two-step batch metal oxide production process where chemical mixing and precursor synthesis occurs in a first reactor, followed by lithiation and coating in a second reactor as depicted by the flowchart in FIG. 5.

In some embodiments, a coated metal oxide production process can be a batch process including a one-pot batch metal oxide production process where chemical mixing, precursor synthesis, lithiation and coating occur in one reactor as depicted by the flowchart in FIG. 6.

An example of the coated metal oxide production process includes a combination of above processes.

A reactor for synthesis and coating may have multiple functions including mixing, shear mixing, ball mixing, agitating, sonicating, milling, ball milling, heating, annealing, calcining, drying, vacuum drying, vacuuming, filtering, and other functions.

A reactor for synthesis and coating comprises stainless steel, stainless steel 304, stainless steel 316, stainless steel 316L, nickel-copper alloys, C400 alloys, Hastelloy, Inconel alloys, and other stainless steel alloys that can withstand high pressure, high temperature, and are corrosion resistant to resist potential corrosion issues caused by fluids in a supercritical state and supercritical water.

A reactor may have one or more bumps, waves, teeth, or blades on the inner wall to improve fluid dynamic property for the mixing and exposure to precursors. The three-dimensional shapes on the inner wall exist to improve the powder mixing and precursor exposures. The shape of a reactor can be cylindrical, cone, cube, cuboid, prism, pyramid, and the cross-section shape can be square, oval, truncated cylindrical, truncated oval, triangle, circle, semi-circle, pentagon, hexagon, heptagon, octagon, nonagon, decagon, and rectangular. The edge can be sharp or rounded. The rotating directions of the reactor can be aligned with the center line of the reactor or not aligned with the center line, or aligned in diversely varied directions during the rotating process.

A reactor may contain a plurality of balls, wherein the plurality of balls comprises one or more of $ZrO_2$, $TiO_2$, stainless steel, and $Al_2O_3$. The shape of ball includes sphere, bar, cylinder, cone, cube, cuboid, prism, and pyramid.

A reactor may contain a shear mixing blade to mix the chemicals in the reactor with a speed of 1 rpm to 10,000 rpm. The blade rotating direction can be aligned with the center line of the reactor or not aligned with the center line, or diversely varied during the rotating process.

A system may include heating control/sensing system, liquid drain system, dry system, vacuum system, vacuum drying system, solution mixing control system, dry mixing control system, pH control/sensing system, pressure control/sensing system, flow control system, high vacuum system, high pressure system, ozone generating system, plasma generating system, supercritical water generating system, compressed air system, inert gas system, precursor gasifying system, gas precursor delivery system, electrical control system, mechanical control system, pneumatic valve control system, milling control/sensing system, ball-mill control system, shear mixing control system, and continuous or batch process automation system.

Supercritical water may be produced by heating water from room temperature in a sealed reactor, pipe, tube, container, vessel, chamber, or combinations thereof at a pressure between 0.1 and 500 bar with a temperature between 2° and 900° C. The supercritical water heater may use electric power or gas power, or combinations thereof. The supercritical water heater can be connected to the heat exchanger to use the waste heat to maintain or heat the supercritical water.

One or more heat exchangers may be utilized in the synthesis and coating processes to collect and re-utilize waste heat for the synthesis and coating processes. The heat exchangers can have a cooling function as they collect the waste heat. The heat exchanger can be a tube, bowl, jar, container, drum, basket, pipe, and combinations thereof.

One example of using waste heat is to generate electricity. Another example of using waste heat is to heat water for use in the synthesis and coating processes. Another example of using waste heat is to use waste heat directly to heat other parts and components in the system such as pipes, powders, tubes, water, solutions, chemicals, precursors, fittings, mixers, reactors, vessels, chambers, and combinations thereof. Re-utilization or recycling of the waste heat may improve overall energy efficiency of the synthesis and coating processes and may reduce overall energy consumption.

After the synthesis and coating processes, materials and water that have not been used can be collected. One example is to extract lithium from the filtered water after a hydrothermal synthesis. This can be a solid form of lithium such as lithium carbonate, lithium hydroxide, lithium chloride, lithium oxide, lithium fluoride, lithium sulfate, lithium nitrate, and other forms of lithium chemicals, or this can be a lithium-containing solution that has lithium as a form of the above enumerated lithium chemicals dissolved in water. Other metals such as nickel, cobalt, iron, manganese, aluminum, and other metals used in the synthesis processes that are dissolved in the filtered water can be also extracted or re-used as described way of lithium. The wastewater can be used after the metals extraction processes. In some cases, the wastewater may be further purified. This re-utilizing or recycling of the wastewater and materials may reduce overall materials consumption and may improve overall yielding of the synthesis and coating processes.

One example of a reduction in total energy consumption by the process is the reduction in treatments required after material particles are synthesized. The process streams require fewer instances of heat application during the coated material synthesis because separate steps are combined, reducing overall energy usage. One example of this is evident in the reduction of the conventional process consisting of three steps: precursor synthesis, lithiation, washing to just a single and continuous step. The removal of a growth-step using high temperature annealing, which is replaced by drying contributes significantly to a reduction of energy. One example of a drying step could use a spray drying or granulation process. Additional examples of a drying step could include a vibration drying method or fluidized bed method.

FIG. 7 depicts a schematic view of a batch hydrothermal reactor to produce a coated metal oxide in accordance with some embodiments. The batch reactor includes an inlet 71, an outlet 72, a stirring mechanism 73 and a stirring blade 74. The inlet 71 can be used to provide a metal-containing solution, additional solution, high energy component, supercritical fluid, chelating agent, complexing agent, ligating agent, and other compounds disclosed herein to the reactor. The outlet 72 can be used to transfer materials from the reactor to another apparatus such as that depicted in FIG. 8. For example, the outlet 72 can be connected to cooling, heat exchange, filtering, drying, and/or ALD coating.

FIG. 8 depicts an example apparatus of a closed-loop continuous hydrothermal process to produce a coated metal oxide in accordance with some embodiments. The apparatus includes a closed-loop portion and an in-line portion. In operation, a metal oxide can be formed in the closed-loop portion and then coated in the in-line portion, the in-line portion being after a filter 810. The apparatus includes a first inlet 81 and a second inlet 82 where valves 83 and 84, respectively, control fluid flow through the inlets 81 and 82. The inlets 81 and 82 can be used to introduce a metal-containing solution or another solution to the apparatus. For example, the other solution can be another metal-containing solution, a coating solution, a high energy component, and/or combinations thereof.

In the case of an uncoated metal oxide synthesis, one of the first or second inlets 81, 82 may not be required since another solution (an additional solution) may not be needed. In the case that the first metal-containing solution has both metal chemicals and coating materials, one of the first or second inlets 81, 82 may not be required since one inlet can deliver both metal chemicals and coating materials. For example, in this case a single reactor (e.g., the closed-loop portion) may have function as both a reactor for metal oxide synthesis and coating the metal oxide. In this context, the example closed-loop continuous process depicted in FIG. 8 includes reactors after inlet 81 and after inlet 82, but a single reactor with a single inlet or multiple reactors with multiple inlets may be provided depending on the targeted metal oxides and coatings.

The apparatus includes a solution delivery mechanism 85, a heater 86, a heat exchanger 811, and waste treatment system 88. A mixture passing through the heat exchanger 811 can be recycled back through the apparatus through a fluid inlet 87. The mixture can be filtered on a filter 810 to collect a product such as a metal oxide. Fluids from the filtration process can be provided to the waste treatment system 88 and removed from the apparatus through an outlet 89 after processing by system 88 or recycled back into the apparatus. The fluids from the filtration process may include unreacted components from a metal-containing solution, high energy component, and/or another solution, such as a coating solution, lithiation solution, or the like. After the filter 810, the apparatus includes a dryer 812. For example, a product collected from the filter 810 can be dried by the dryer 812. The product collected from the filter 810 can be further processed as depicted in FIG. 8. The product can flow through a tube which includes an alternating series of valves 813, 814, and 816 and inlets 818, 819. The tube can include a powder delivery mechanism 820. The tube may be attached to a pump 817. The inlets 818, 819 may be used to provide additional materials to the product. For example, the inlets 818, 819 can provide materials for an ALD process.

Example embodiments may include one or more controllers. In some embodiments, controllers may include one more processors, such as processor. Processor may include, for example, a microprocessor, microcontroller, digital signal processor (DSP), application specific integrated circuit (ASIC), or any other digital or analog circuitry configured to interpret and/or execute program instructions and/or process data. In some embodiments, processor may be communicatively coupled to memory. Processor may be configured to interpret and/or execute non-transitory program instructions and/or data stored in memory. Program instructions or data may constitute portions of software for carrying out fluid system modeling, as described herein. Memory may include any system, device, or apparatus configured to hold and/or house one or more memory modules; for example, memory may include read-only memory, random access memory, solid state memory, or disk-based memory. Each memory module may include any system, device or apparatus configured to retain program instructions and/or data for a period of time (e.g., computer-readable non-transitory media).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the elements that it introduces.

A number of examples have been described. Nevertheless, it will be understood that various modifications can be made. Accordingly, other implementations are within the scope of the following claims.

The invention claimed is:

1. A method for making a coated metal oxide, comprising:
mixing a first metal-containing solution and a first supercritical fluid to facilitate formation of a metal oxide, wherein the metal oxide is formed in a closed-loop continuous hydrothermal process;
forming a coating in the closed-loop continuous hydrothermal process by mixing an additional solution to facilitate formation of a coating on the metal oxide, or forming the coating by depositing one or more atomic layers on a surface of the metal oxide using a first metal-containing compound and an oxidizing gas, wherein the coating comprises at least one of a metal, a polymer, or a conductive material;
separating the metal oxide or coated metal oxide formed from a waste fluid, where the waste fluid contains unreacted components from the first metal-containing solution and the first supercritical fluid; and extracting one or more metals from the waste fluid, wherein the one or metals comprise lithium wherein the first metal-containing solution and the first supercritical fluid are recycled in the closed-loop hydrothermal process prior to the separation of the metal oxide or coated metal oxide from the waste fluid.

2. The method of claim 1, further comprising:
recycling the post-extracted waste fluid to facilitate formation of additional metal oxide or coated metal oxide.

3. The method of claim 1, where the first supercritical fluid comprises at least one of water, a metal-containing compound, a pH controlling agent, a chelating agent, a complexing agent, or a ligating agent.

4. The method of claim 1, wherein the first metal-containing solution comprises a second metal-containing compound.

5. The method of claim 1, where the first metal-containing solution further comprises at least one of water, a pH controlling agent, a chelating agent, a complexing agent, or a ligating agent.

6. The method of claim 1, further comprising:
mixing a second metal-containing solution with the first metal-containing solution and the first supercritical fluid, where the second metal-containing solution has at least one metal that is different from the first metal-containing solution or includes a material that forms a coating on the metal oxide.

7. The method of claim 4, further comprising:
mixing a second supercritical fluid with the first metal-containing solution and first supercritical fluid, where the second supercritical fluid has at least one metal that is different from the first metal-containing solution or includes a material that forms a coating on the metal oxide.

8. The method of claim 1, wherein forming the coating comprises:
depositing the one or more atomic layers on a surface of the metal oxide using the first metal-containing compound and the oxidizing gas.

9. The method of claim 1, further comprising:
lithiating at least one of the metal oxide or the coating.

10. The method of claim 9, further comprising:
de-lithiating at least one of the metal oxide or the coating.

11. The method of claim 1, wherein the metal oxide comprises a nickel manganese cobalt oxide.

* * * * *